J. R. PERRY.
WOODEN HOUSES.
No. 6,995. Reissued March 14, 1876.
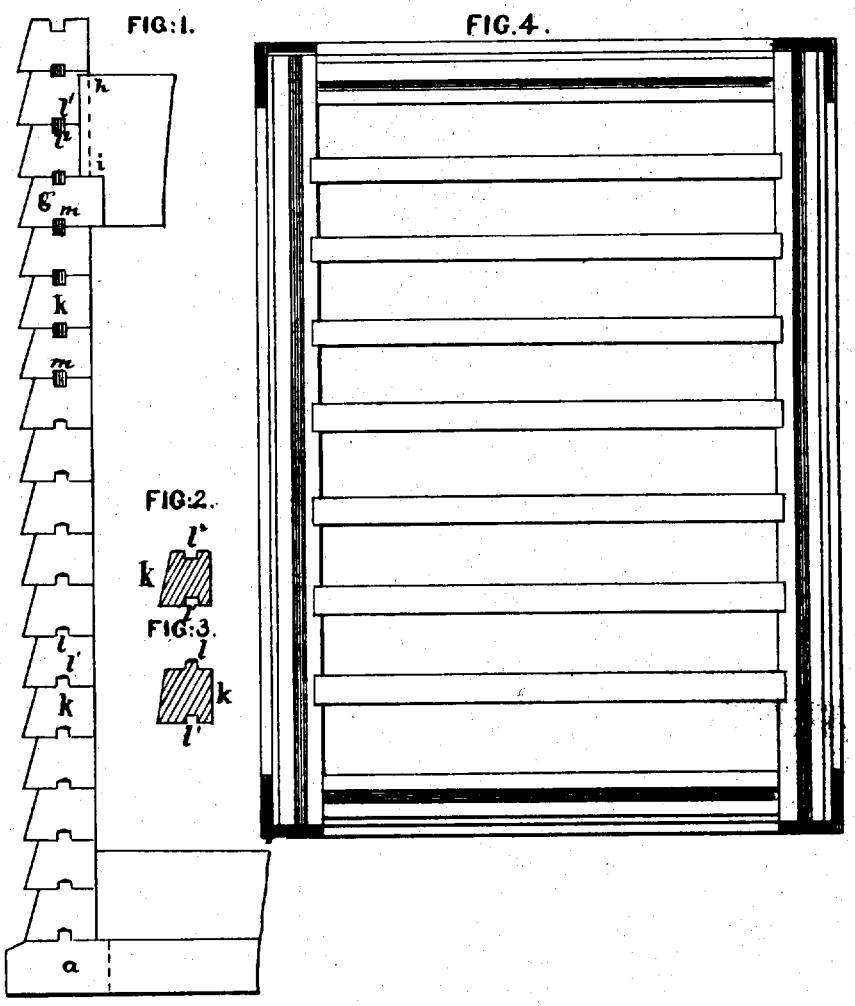
WITNESSES:
James Greenwood Jr.
J. B. Holderby
Joseph R. Perry
INVENTOR.
Per Robt. A. Lacey
ATTORNEY.

UNITED STATES PATENT OFFICE.

JOSEPH R. PERRY, OF WILKESBARRE, PENNSYLVANIA.

IMPROVEMENT IN WOODEN HOUSES.

Specification forming part of Letters Patent No. 154,188, dated August 18, 1874; reissue No. 6,995, dated March 14, 1876; application filed January 26, 1876.

*To all whom it may concern:*

Be it known that I, JOSEPH R. PERRY, of Wilkesbarre, in the county of Luzerne and State of Pennsylvania, have invented certain new and useful Improvements in Wooden Houses; and I do hereby declare that the following is a full, clear, and exact description thereof, which will enable others skilled in the art to which it pertains to make and use the same, reference being had to the drawings, and to the letters of reference marked thereon, which form a part of this specification.

My invention relates to improvements in the construction of wooden houses; and has for its object to construct a strong and substantial solid wooden wall, wherein the use of studding, posts, and other upright supports is dispensed with, and which will possess all the requisites of economy, ease in construction, and protection against the weather.

It consists in a series of horizontal timbers which are dressed and joined together in any suitable manner, and having their inner faces perpendicular and flush with each other, forming a smooth continuous inner surface.

Figure 1 is a vertical cross-section of a wall constructed according to my invention. Figs. 2 and 3 show different modes of constructing the timbers with grooves or tongues and grooves, and Fig. 4 is a top view of sides, ends, and a tier of joists.

In the construction of the walls of the house made according to my invention, the bottom timber *a* is made larger than the other timbers, in order to furnish a substantial base on which to rest the wall, sleepers, and upright boards used to protect the corners. The longitudinal timbers *k*, which compose the walls, are made rectangular, except that the outer faces may be dressed to any desired form for ornamentation, or for protection against rain or storm. They are square or oblong in cross-section. The upper and under faces are so dressed that when two timbers are laid together a close joint is formed. They are of uniform size and have their inner faces neatly dressed, so that when the wall is completed there is presented to the room within a smooth continuous surface, which may be painted or papered.

Figs. 2 and 3 show different methods of constructing the timbers *k*, with tongues and grooves $l\ l^1$, for uniting them together. When timbers having two grooves, $l^1\ l^2$, as shown in Fig. 2, are employed, I place within said grooves a tongue-strip, *m*.

The timber *g*, placed at the height desired for the ceiling, is made wider and projects inwardly sufficiently to furnish a rest or support for the joists.

In the construction of houses of two or more stories the ends of the joists are let into the wall-timbers, as shown by dotted lines *h i*, which gives strength to the structure.

It will be seen that in a house constructed according to my invention the use of all framing, lathing and plastering, or inside lining is dispensed with, and that a firm, substantial, self-sustaining wall is produced, and that such a structure is admirably adapted for all purposes where cheap houses are required.

It will be further seen that a building constructed according to my invention may be partitioned into any number of compartments desired, the partition or partitions employed being constructed of the horizontal timbers *k*, and in the same manner as the outer walls, and connected with the latter and with each other by ordinary means.

Having described my invention, what I claim, and desire to secure by Letters Patent, is—

In the construction of wooden houses, a self-sustaining wall composed of the horizontal timbers *k*, provided with tongues and grooves $l\ l^1$, substantially as and for the purpose set forth.

In testimony that I claim the foregoing as my own invention I hereto affix my signature in the presence of two witnesses.

JOSEPH R. PERRY.

Witnesses:

JAMES GREENWOOD, JR.,

S. F. AUSTIN.